(12) United States Patent
Huomo (10) Patent No.: US 7,868,737 B2
(45) Date of Patent: *Jan. 11, 2011

(54) SYSTEM AND METHOD FOR SUPPORTING MULTIPLE READER-TAG CONFIGURATIONS USING MULTI-MODE RADIO FREQUENCY TAG

(75) Inventor: Heikki Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 199 days.

This patent is subject to a terminal disclaimer.

(21) Appl. No.: 12/243,691

(22) Filed: Oct. 1, 2008

(65) Prior Publication Data

US 2009/0033498 A1    Feb. 5, 2009

Related U.S. Application Data

(63) Continuation of application No. 10/610,101, filed on Jun. 30, 2003, now Pat. No. 7,446,646.

(51) Int. Cl.
*H04Q 5/22* (2006.01)
(52) U.S. Cl. .................. 340/10.1; 340/10.2; 340/10.51; 340/572.3
(58) Field of Classification Search ................ 340/10.1, 340/10.2, 10.3, 10.51, 572.1, 572.5, 572.6, 340/572.7; 343/726, 742; 361/765; 235/383, 235/435; 455/277.1, 135, 277.2; 705/16, 705/23, 65
See application file for complete search history.

(56) References Cited

U.S. PATENT DOCUMENTS

| 3,938,044 A | 2/1976 | Lichtblau |
| 4,728,938 A | 3/1988 | Kaltner |
| 5,103,210 A | 4/1992 | Rode et al. |
| 5,103,222 A | 4/1992 | Esch et al. |
| 5,842,118 A | 11/1998 | Wood, Jr. |
| 5,874,902 A | 2/1999 | Heinrich et al. |

(Continued)

FOREIGN PATENT DOCUMENTS

WO    WO 94/14143    6/1994

(Continued)

OTHER PUBLICATIONS

Richard Shim, "Radio ID chips to come with kill switch," http://rss.com.com/2102-1039_3-999794.html?tag=ni_print (printed from internet Jun. 27, 2003).

(Continued)

*Primary Examiner*—Edwin C Holloway, III
(74) *Attorney, Agent, or Firm*—Hollingsworth & Funk, LLC (57) ABSTRACT

A system, apparatus and method for supporting multiple reader-tag configurations and reader-tag distances using a single multi-mode tag. A multi-mode radio frequency (RF) transponder is provided, which includes operational tag circuitry configured to provide information in response to being activated by a reader device(s). Multiple antenna circuits are coupled to the operational tag circuitry, where each of the antenna circuits is configured to operate at a different reader-tag distance. At least one disabling circuit is coupled to the operational tag circuitry and to at least one of the antenna circuits, where the disabling circuit is configured to disable operation of at least one of the antenna circuits to which it is coupled.

20 Claims, 7 Drawing Sheets

U.S. PATENT DOCUMENTS

| | | |
|---|---|---|
| 6,025,780 A | 2/2000 | Bowers et al. |
| 6,072,383 A | 6/2000 | Gallagher, III et al. |
| 6,104,281 A | 8/2000 | Heinrich et al. |
| 6,104,311 A | 8/2000 | Lastinger |
| 6,169,483 B1 | 1/2001 | Ghaffari et al. |
| 6,208,235 B1 | 3/2001 | Trontelj |
| 6,317,028 B1 * | 11/2001 | Valiulis .................... 340/10.1 |
| 6,480,110 B2 | 11/2002 | Lee et al. |
| 7,075,412 B1 | 7/2006 | Reynolds et al. |
| 2002/0097143 A1 | 7/2002 | Dalglish |
| 2002/0149468 A1 | 10/2002 | Carrender et al. |
| 2003/0116634 A1 | 6/2003 | Tanaka |

FOREIGN PATENT DOCUMENTS

| | | |
|---|---|---|
| WO | WO 00/27137 | 5/2000 |
| WO | WO 02/39379 | 5/2002 |

OTHER PUBLICATIONS

Alorie Gilbert, "Major retailers to test 'smart shelves'," http://rss.com.com/2102-1017-979710.html?tag=ni_print, (printed from internet Jun. 27, 2003).

* cited by examiner

SYSTEM AND METHOD FOR SUPPORTING MULTIPLE READER-TAG CONFIGURATIONS USING MULTI-MODE RADIO FREQUENCY TAG

CROSS-REFERENCE TO RELATED APPLICATIONS

This is a continuation application of application Ser. No. 10/610,101, filed Jun. 30, 2003, now U.S. Pat. No. 7,446,646, the content of which is incorporated herein by reference in its entirety.

FIELD OF THE INVENTION

This invention relates in general to radio frequency (RF) communication, and more particularly to a system, method and apparatus for facilitating multiple reader-tag configurations and distances using a single multi-mode RF transponder/tag.

BACKGROUND OF THE INVENTION

Wireless technologies continue to evolve, increasingly providing tremendous ease and efficiency of once laborious business and personal tasks. Long-range cellular and other wireless networks have made possible today's mobile society, allowing mobile voice communication, messaging, multimedia communications, e-mail, Internet access, and access to a wide range of wireless applications and services. Short-range wireless technologies have also made significant strides in today's society, both in the personal and business arenas. One such short-range wireless technology involves Radio Frequency Identification (RFID) technology.

Generally, RFID technology utilizes electromagnetic or electrostatic coupling in the radio frequency (RF) portion of the electromagnetic spectrum. RFID readers include at least an antenna and transceiver, where an RF signal may be transmitted from the RFID reader. The RF signal activates transponders or "tags" when touched to, or comes within a predetermined range of, the tags. When a tag has been activated, it transmits information back to the RFID reader. More particularly, in the case of a passive tag (i.e., having no local power source), the tag may be energized by a time-varying electromagnetic RF wave generated by the RFID reader. When the RF field passes through the antenna coil associated with the tag, a voltage is generated across the coil. This voltage is ultimately used to power the tag, and make possible the tag's return transmission of information to the reader, sometimes referred to as backscattering.

RFID tags may be beneficially used in any number of situations. For example, a business may associate tags with their products to facilitate tracking, sorting, or otherwise monitoring products through manufacturing, logistics, inventory, or other pre-sale supply chain stages. RFID readers can be used at various stages of the supply chain to perform such functions. Because these types of supply chain functions generally involve volumes of products moving from place to place, it is generally the most advantageous to employ readers and tags that can communicate at relatively long distances, at least in the RFID context. More particularly, passive tags are often used in such situations due to their relatively low cost versus active tags. While passive tags are limited in their ability to reflect or retransmit (i.e., backscatter) information in response to receiving a reader signal, at some frequencies these distances can be stretched up to a number of meters, which is suitable for certain stages of the supply chain. The distance at which RF communication can be achieved is dependent on a number of factors, such as antenna coil dimensions, emitted reader power, the tag's quality factor, and the frequency of the emitted signal. For example, 900/2400 MHz frequencies are suitable for longer reader-tag distances, and can be on the order of meters.

While longer read distances may be beneficial at some times, they may in other instances be undesirable. For example, the same products being tracked, sorted, and otherwise monitored during pre-sale manufacturing and logistics will likely end up on the shelves of wholesale or retail stores. Relevant product information then becomes less reliant on the characteristics of volumes of product, and more reliant on the product itself. For example, a consumer is likely interested in information relating to an individual product itself, such as the product description, warranty information, cost per unit, and the like.

However, current tag technology is single mode tag technology, in that each tag is configured for a particular read distance. Due to the cost and efficiency benefits of using RFID technology during manufacturing, logistics, and other phases prior to the point of sale, tag technology is driven by these pre-sale business benefits. This results in product tags being forever capable of long read distances. This, however, may be undesirable to the consumer. For example, active long read distances during consumer ownership/use allows the product to essentially be tracked by any RFID reader within the configured range of the product tag, which can be a violation of the consumer's privacy. On the other hand, not having a tag associated with the product eliminates the opportunity for consumers to obtain the benefit of receiving product information while making purchasing decisions and during the useful life of the product. The inability for consumers to take advantage of RFID technology and the associated product information is particularly wasteful in today's society, where RFID readers may be provided in mobile terminals such as mobile phones, Personal Digital Assistants (PDAs), or other mobile devices that the consumers have with them at virtually all times.

Accordingly, there is a need for a manner in which tag information can be accessible to all potential users coming into proximity of items equipped with such tags. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for supporting multiple reader-tag configurations and reader-tag distances using a single multi-mode tag.

In accordance with one embodiment of the invention, a multi-mode radio frequency (RF) transponder is provided. The transponder includes operational tag circuitry configured to provide information in response to being activated by a reader device(s). Multiple antenna circuits are coupled to the operational tag circuitry, where each of the antenna circuits is configured to operate at a different reader-tag distance. At least one disabling circuit is coupled to the operational tag circuitry and to at least one of the antenna circuits, where the disabling circuit is configured to disable operation of at least one of the antenna circuits to which it is coupled.

In accordance with more particular embodiments of such a multi-mode RF transponder, the disabling circuit includes a permanent disabling circuit adapted to permanently disable operation of the particular antenna circuits. In an alternative embodiment, the disabling circuit includes a temporary disabling circuit adapted to temporarily disable operation of the particular antenna circuits. Such permanent or temporary disabling circuits may include, for example, a mechanical switch, electronic switch, fuse, and the like. In one embodiment, at least some of the antenna circuits are configured to operate at different frequency bands. In a more particular embodiment, a first antenna circuit is configured to induce a voltage to power the operational tag circuitry in response to a received signal having a frequency in approximately a 13.56 MHz frequency band, and a second antenna circuit is configured to induce a voltage to power the operational tag circuitry in response to a received signal having a frequency in approximately a 900/2400 MHz frequency band. In yet another embodiment, at least some of the antenna circuits are configured with different physical characteristics affecting the reader-tag distance of the respective antenna circuit, such as different antenna geometries, antenna configurations, power levels, etc.

According to another embodiment of the invention, a multi-mode Radio Frequency Identification (RFID) tag is provided. The RFID tag includes a first tag circuit including a first antenna coil to receive a first reader signal, a first memory to store first information, and a first processing circuit to provide the first information in response to the first reader signal. A disable circuit is coupled between the first antenna coil and the first processing device to disable operation of the first tag circuit. A second tag circuit is provided that includes a second antenna coil to receive a second reader signal, a second memory to store second information, and a second processing circuit to provide the second information in response to the second reader signal.

In accordance with another embodiment of the invention, a method is provided for obtaining information concerning an item. The method includes associating an RFID tag with the item, where the RFID tag includes multiple antenna circuits each operable at a different reader-tag distance. First information is communicated from a first one of the antenna circuits to a first reader device(s) operable at a first reader-tag distance. The first antenna circuit may then be disabled, and second information is communicated from a second one of the antenna circuits to a second reader device(s) operable at a second reader-tag distance.

In more particular embodiments of such a method, the first antenna circuit may be re-enabled to reestablish communication between the first antenna circuit and the first reader devices operable at the first frequency band. In yet a more particular embodiment, the second antenna circuit is disabled in connection with re-enabling the first antenna circuit. In other particular embodiments, additional antenna circuits may be provided on the tag, such that the multiple antenna circuits include N antenna circuits, where up to N−1 of the antenna circuits may be disabled, and information from a remaining enabled one of the antenna circuits is communicated to a reader device(s) operable at a corresponding reader-tag distances.

In accordance with another embodiment of the invention, a method is provided for obtaining information concerning an item. The method involves associating an RFID tag with the item, where the RFID tag includes multiple antenna circuits each operable at a different frequency band. First information is communicated from a first antenna circuit to a first reader device(s) operable at a first frequency band. The first antenna circuit is disabled, and second information from a second antenna circuit is communicated to a second reader device(s) operable at a second frequency band.

In accordance with another embodiment of the invention, a method is provided for supplying information associated with an item via an RF transponder. The method involves receiving a first RF signal at the RF transponder from a first reader device, and inducing a first voltage on a first antenna loop in response to receiving the first RF signal. A DC voltage is generated from the induced first voltage to energize transponder logic. First information is retrieved via the transponder logic and transmitted to the first reader device(s). The first antenna loop is disabled in response to a disable signal, and a second RF signal is received at the RF transponder from a second reader device. A second voltage is induced on a second antenna loop in response to receiving the second RF signal, and a DC voltage is generated from the induced second voltage to energize the transponder logic. Second information is then retrieved via the energized transponder logic and transmitted to the second reader device.

In more particular embodiments of such a method, the first information is retrieved from a first memory, and the second information is retrieved from a second memory. Alternative embodiments also involve disabling the first antenna loop in reversible and irreversible manners.

In accordance with another embodiment of the invention, a system is provided for obtaining information relating to items. The system includes a first RFID reader capable of emitting a first RF signal, at least one mobile terminal including a second RFID reader capable of emitting a second RF signal, and a multi-mode RFID tag associated with at least one of the items. The multi-mode RFID tag includes a first antenna circuit to receive the first RF signal, a first memory to store first information, and a first processing circuit to modulate the first information onto a backscattered RF signal to the first RFID reader in response to the first RF signal. The RFID tag also includes a disable circuit coupled to the first antenna circuit to disable operation of the first antenna circuit. A second antenna circuit is provided to receive the second RF signal, and includes a second memory to store second information and a second processing circuit to modulate the second information onto a backscattered RF signal to the second RFID reader in response to the second RF signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner for facilitating multiple RF reader-tag configurations and read distances. Certain information relating to various items may be important to manufacturers, handlers, consumers, and other users of the items. The relevant information may be stored on transponders or "tags" associated with the items. Because the various information seekers may have different information needs, reader device configurations, read volume requirements and the like, the RF communication needs between the various reader devices and tags may differ. In accordance with the present invention, tags are equipped with multiple antenna circuits capable of communicating at different read distances. This can be accomplished using different antenna dimensions/configurations, and/or may be accomplished using different antenna circuits operable at different frequencies. Thus, communication can be effected between first reader devices and the tag at a first read distance, subsequently disabled to disallow further communication in that manner, and allowing communication between second reader devices and the tag at a second read distance. The invention is scalable in that additional antenna circuits and disable circuits may be utilized. In this manner, a single multi-mode tag may be used for virtually any set of circumstances in which a tagged item may be involved.

The present invention may be implemented in any situation where multiple read distance alternatives may be desirable. One such situation involves a typical supply chain. In the supply chain, the reader-tag distance may be on the order of meters during manufacturing, production, inventory, or other logistics-related function, while relatively small reader-tag distances may be desired at supply chain stages involving the consumer. One such implementation is described below in connection with FIG. 1. However, as will become readily apparent to those skilled in the art from the description provided herein, the present invention is applicable to any reader/transponder application where multiple reader-tag distances may be desirable and/or appropriate.

Figure 1:
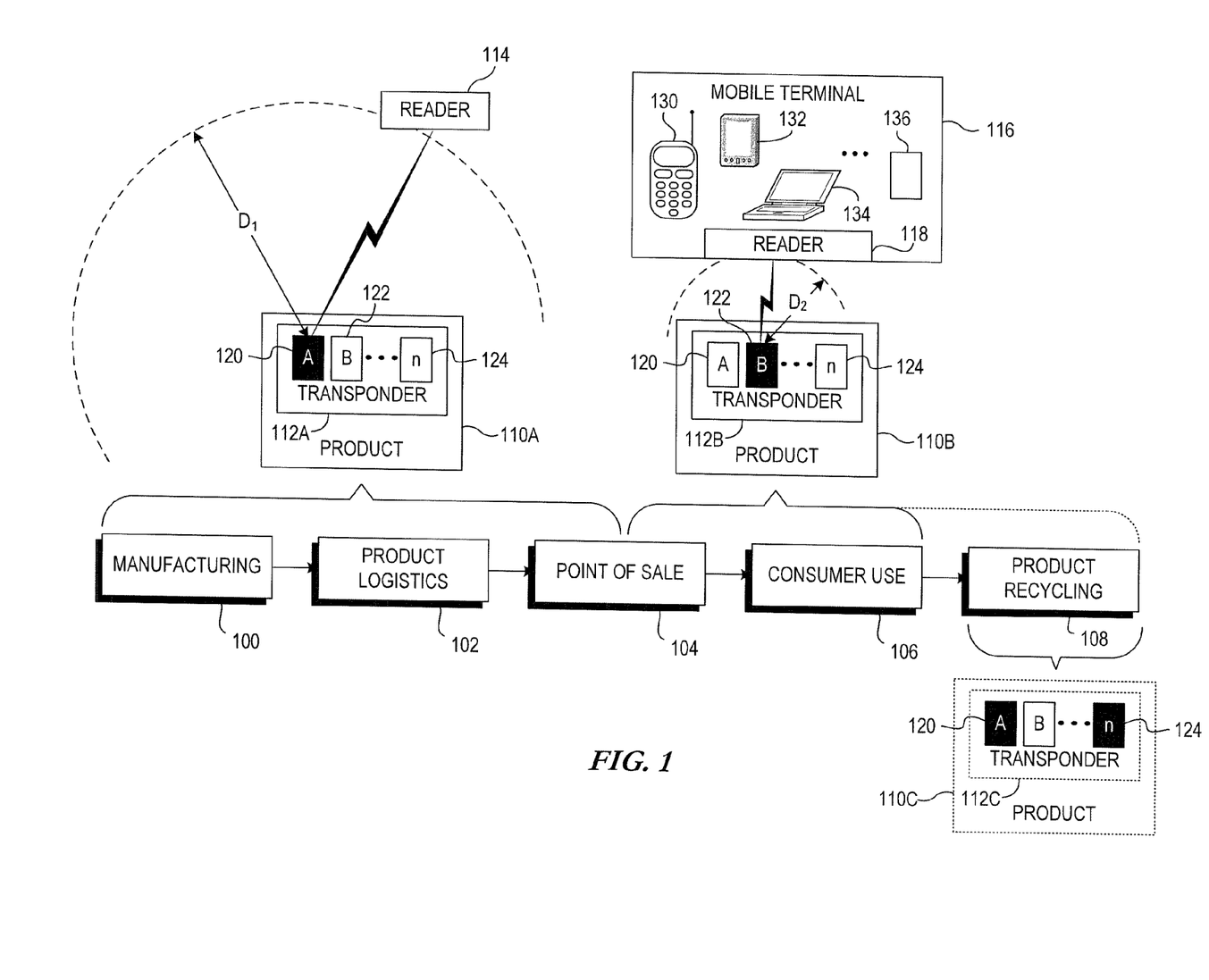
FIG. 1 is a block diagram illustrating a representative environment in which the principles of the present invention may be beneficially implemented.

FIG. 1 is a block diagram illustrating a representative environment in which the principles of the present invention may be beneficially implemented. In the illustrated embodiment, a typical product/supply chain is illustrated. The illustrated supply chain may not illustrate each stage of a typical supply chain for ease of description. For example, the illustrated supply chain includes a manufacturing stage 100, product logistics 102, point of sale 104, consumer use 106, and product recycling 108. At the manufacturing stage 100, products are generally assembled, constructed, or otherwise prepared such that the product is operable for its intended use. The product logistics stage 102 generally represents any number of functions relating to the planning, controlling, distributing, shipping, maintaining inventory, or other functions associated with the flow of finished goods to the point of sale 104. The point of sale stage 104 refers to the stage at which a consumer may purchase the product(s), such as a retail or wholesale outlet. Post-consumer use may involve disposing of the product and/or making the used product available for product recycling 108.

Prior to the certain stages, such as prior to the point of sale 104 and/or consumer use 106, it may be desirable to track products through the manufacturing 100 and product logistics 102 stages. For example, in the manufacturing/logistics portion of the chain, it may be desirable to track products 110A on the assembly line, through packaging, shipping, etc. The use of electronic product information may be highly beneficial to this end. Such electronic product information may come in the form of a Universal Product Code (UPC), an Electronic Product Code (EPC), or other analogous electronic information source. This type of information may be provided, for example, using electromagnetic/electrostatic coupling technology. As a more particular example, this electromagnetic/electrostatic coupling may be implemented in the radio frequency portion of the electromagnetic spectrum, using radio frequency identification (RFID). Another device, such as a portable/mobile reader device, may then be equipped with an RFID reader, and the transponders or "tags" are activated by radio frequency waves emitted by the reader device. When activated, the tag transmits information to the reader device. A user of the reader device may use the received information directly, or alternatively the received information may be used to initiate a request to an operator network, such as an Object Naming Service (ONS) request. An ONS is a service available via an operator network for looking up UPCs and/or EPCs from which information can then be provided back to the reader device or to another network destination.

The product 110A illustrates the use of such a transponder or "tag" 112A. During manufacturing 100, logistics 102, or possibly at or near the point of sale 104 (e.g., inventory), the electronic product information generally needs to be read from remote distances to enable reading off carts, pallets, trucks, and the like. The same may hold true for functions at a store, in order to control inventory of products on the shelves or otherwise at their point of storage and/or sale. Another example involves the use of a tag 112A in connection with theft protection, such as using a reader-tag arrangement to monitor items within a store up to the actual point of sale 104. During this time, a tag 112A capable of operating with a reader device 114 at far distances $D_1$ may be beneficial, e.g., up to a number of meters or more.

On the other hand, for the consumer coming to the store or other location to consider and/or make a purchase of a product 110B, the consumer may want to obtain product-related information. For example, the consumer may want information different from that provided via a tag during manufacturing, such as product descriptions, product ratings, warranty information, and the like. Using transponders such as RFID tags, the user can obtain the information directly from the tag 112B, using a mobile terminal 116 equipped with an RFID reader 118. Such information may be provided by, for example, pre-configured memory devices such as static RAM, FLASH, etc. Dynamic memory or memory otherwise capable of being written may instead (or in addition) be used on such tags. For example, a store owner may want to include and/or update certain information in the tag 112B, such as manufacturer warranty information, store warranty information, store return/exchange policies, provide coupons or advertisements, and the like. The use of memory capable of being written and/or updated may be very beneficial in such circumstances. Instead of (or in addition to) obtaining information directly from the RFID tag 112B, the RFID tag 112B may provide a Uniform Resource Identifier (URI) such as a Uniform Resource Locator (URL) used in connection with the Internet, from which the consumer may obtain the information by way of mobile services such as Wireless Application Protocol (WAP) transactions, Short Messaging Service (SMS) messages, Multimedia Message Service (MMS) messages, Java (or analogous programming technology) downloads, and the like.

In connection with information retrieval by a consumer via a mobile terminal 116, the use of tags 112B provides the benefit (among others) that the user does not need to go through any service discovery such as an Internet search engine. Rather, the product on which the information is requested may be obtained by a touch of (or being within close proximity to) the tag 112B via the consumer's private RFID (or analogous) reader 118. Such a reader 118 available with a mobile terminal 116 generally implements a touch/near read distance $D_2$ (information transfer up to a number of centimeters, for example). This may be the case for a number of reasons. For example, since the read distance is a function of the antenna loop diameter, a large antenna loop diameter may require a larger reader device 118, which is often counter to the goal of keeping mobile terminal 116 size at a conveniently small size for the user.

Further, privacy issues may dictate the desired read distance. For example, it may be undesirable that the tags 112B are implemented such that far read distances are possible, since this may facilitate the electronic tracking of consumer-purchased goods and the owner of the goods as they pass through other reader circuits. By keeping the read distance at the touch/near range, the product will not be able to be tracked by other reader devices, and the antenna loop at the reader device 118 may be smaller and better suited for portable/mobile devices. The need for such a touch/near read distance to identify product-related information may continue through the life of the product while the consumer is using it, up to, for example, the point of disposal/recycling 108. In some instances, the same or a different remote/far read distance may again be desirable at the point of disposal, as product recycling 108 may involve sorting and/or tracking the products. This is depicted by product 110C associated with the product recycling stage 108.

The desire to track products 110A at remote/far distances during manufacturing 100, logistics 102, and up to the point of sale 104 may conflict with the desire for consumers to track the same products 110B at the point of sale 104 and during consumer use 106. This is due to a tag's pre-configured read distance. For example, tags are currently configured with remote/far distance capabilities, in order to facilitate the needs of manufacturing/logistics and other pre-sale events. As indicated above, this may be undesirable to the consumer, as a tag configured for reading from remote/far distances may be tracked by other reader devices. One solution to this problem might be to disable or discard the tag from the product at the point of sale 104, however this would remove the opportunity for the ultimate consumer to obtain valuable product-related information via such tags.

In accordance with the present invention, "remote/far distance" reader-tag communication is made possible during pre-sale events, while "touch/near" reader-tag communication is made possible for consumer use. In accordance with one embodiment of the invention, this is accomplished by providing tags that are responsive to multiple reader-tag distances. For purposes of illustration, two such reader-tag distances are described in connection with FIG. 1, namely $D_1$ and $D_2$. These different distances may be any different distances, and for purposes of this description are characterized as "touch/near" (e.g., up to 50 mm) and "remote/far" (e.g., from 500 mm to 4 m). The present invention is applicable regardless of the particular distances, which are largely dependent on the physical antenna coil characteristics at the reader and tag, power factors, the tags' quality factor (Q), and the like. For example, a tag having a relatively small antenna coil diameter may provide a lower backscatter range, as such a range is generally proportional to the extent to which flux lines are extended from the antenna coil.

In any event, the present invention is applicable regardless of the particular distances involved. The invention provides a manner of selectively activating/disabling multiple reader-tag distances. While the description provided herein generally refers to two such reader-tag distances, the invention is equally applicable to three, four, or more reader-tag distances. Further, read distances for the 13.56 MHz band and the 900/2400 MHz band are described, but the invention is equally applicable to other frequency bands. In accordance with the present invention, the particular read distances provided by the tag may be collectively active, separately active, or a combination thereof in the case where three or more reader-tag distances are provided. In addition to facilitating multiple reader-tag distances, the present invention provides a manner of disabling one or more of the read capabilities. Separate tag memory areas may also be provided to respectively store information associated with each of the reader-tag distances; e.g., one memory associated with manufacturing/logistics information, and another associated with product and/or warranty descriptions for the consumer.

The interaction distance between the tag and the reader at the 13.56 MHz band (for example) is primarily governed by the reader and tag physical antenna loop size. Current RF tags are typically credit card-sized to enable reading from somewhat far distances. Some of the reader implementations, such as at business entrances, public transport facilities, etc., have read distances of about 5-10 cm, as the reader coil dimensions are typically on the order of approximately 10 cm in diameter. At 13.56 MHz, the tag in accordance with one embodiment of the invention is equipped with an antenna that enables reading from distances which are approximately the same order as the size of the antenna loop. For example, if the tag antenna dimension is 10 mm in diameter, the read distance is approximately 40 mm maximum, assuming that regulatory limits of the emitted reader power are honored. It is intuitive for a user to "touch" a tag to read tag content at short distances. Thus, the read distance in such a situation is defined by constructing the loop antenna on the tag to be a particular size (e.g., diameter and number of turns of the antenna loop).

At a second frequency band such as 900/2400 MHz, the present invention provides a different antenna configuration on the tag. The RF field generated by the reader is dominated by near field effects up to distances of approximately 0.1 times the wavelength (e.g., 1-3 cm in such frequencies), and far field effects at greater distances. Thus, the read distance may be defined by having two (or more) separate antenna configurations for the near/far electromagnetic fields.

An example is illustrated in FIG. 1. The transponder 112A, 112B, 112C is equipped with multiple antenna circuits, depicted as antenna circuit A 120, antenna circuit B 122, through antenna circuit n 124. For remote/far reader distances, the transponder 112A may have antenna circuit A 120 active. Antenna circuits B 122 through n 124 may also be active, or may be temporarily disabled. During the manufacturing 100, logistics 102, or other pre-consumer periods, a remote/far reader distance $D_1$ may be possible between the reader 114 and the product 110A using antenna circuit A 120 of an RFID tag 112A. When the product 110B reaches a point in the supply chain when a consumer may want to read tag information using a mobile terminal 116, a different antenna circuit operable with a read distance $D_2$ such as antenna circuit B 122 may be used, where antenna circuit A 120 thus disabled. The mobile terminal 116 may be any type of mobile terminal equipped with an RFID or other analogous reader 118, such as a mobile phone 130, Personal Digital Assistant (PDA) 132, laptop/notebook computer 134, or other portable computing device 136 equipped with such a reader 118.

In this manner, different read distances may be utilized depending on the particular circumstances. In accordance with one embodiment of the invention, some antenna circuits are disabled while another antenna circuit is active. For example, during the manufacturing/logistics stages, remote/far antenna circuit A 120 may be active, while antenna circuit B 122 (and others if present) is disabled. Alternatively, antenna circuit B 122 may also be active, but the read distance between the transponder 112A and the reader 114 is such that only antenna circuit A 120 will be capable of communicating with the reader 114. In one embodiment, the different antenna circuits 120, 122, 124 operate at a particular frequency and have different antenna geometries/configurations to operate at different read distances. In another embodiment of the invention, different frequencies are used with different antenna circuits 120, 122, 124. For example, antenna circuit A 120 may operate at a frequency suitable for remote/far reader-tag distances, while antenna circuit B 122 may operate at a different frequency suitable for near/touch reader-tag distances. When the product is at the point of sale 104 and/or the consumer use stage 106, antenna circuit A 120 may be disabled such that only antenna circuit B 122 is operable. This allows the transponder-equipped product 110B to only be read by readers within the read distance $D_2$ of the mobile terminal 116 (or other reader device).

In accordance with one embodiment of the invention, disabling of the previously active antenna circuit (antenna circuit A 120 in the illustrated example) is disabled permanently. For example, a disable circuit incorporating a fuse may be employed, wherein the fuse is open circuited at the time that antenna circuit A 120 is to be disabled. This allows antenna circuit B 122 to be used, without the possibility of other reader devices at remote/far read distances to read (or write, as the case may be), or otherwise track, the transponder 112B.

In another embodiment of the invention, disabling the previously active antenna circuit may involve temporary disabling of the antenna circuit. For example, antenna circuit A 120 may be temporarily disabled at the point of sale 104 and/or during consumer use 106. In such an embodiment, a register, memory location, or other storage component may store an enable flag(s) that notifies processing logic (not shown) on the tag 112B that antenna circuit A 120 is not to provide any information. Alternatively, electronic or mechanical switching elements such as transistor switches, toggle switches, DIP switches, and the like may be used to temporarily disable antenna circuit A 120 during consumer use 106. Temporary disabling of antenna circuit A 120 operable at remote/far distances may be beneficial where it is desirable to restore remote/far distance reading at a later time. For example, it may be desirable to re-enable antenna circuit A 120 during a product recycling stage 108, to allow sorting, tracking, or other functions associated with the efficient recycling of products. The transponder 112C associated with product 110C illustrates such an example, where antenna circuit A 120 is re-enabled. Alternatively, a different antenna circuit, such as antenna circuit n 124, may be used during the recycling stage 108.

It should be noted that the present invention is applicable in any situation involving the need or desire to provide multiple reader-tag distances, and the description of FIG. 1 is described in terms of a supply chain embodiment as a representative embodiment in which the principles of the present invention are applicable. For example, some tags may utilize multiple antenna circuits in accordance with the present invention to accommodate different mobile terminal reader capabilities, different privacy needs, and the like. One such example may be the use of a multi-mode tag according to the invention in the context of luggage handing at airports, where remote/far reader-tag configurations are used to sort and direct luggage to the appropriate baggage conveyer, while near/touch reader-tag configurations may be used by a luggage owner to determine whether a particular piece of luggage belongs to him/her (e.g., where the tag returns a name, address, password, etc. in response to the mobile terminal reader being within the near/touch range). Another example involves theft protection. For example, a remote/far reader distance and appropriate antenna circuit may be used while the product is in the store and prior to actual sale of the product. In this manner, the product may be tracked by one or more reader devices to ensure that the product does not leave the store before it has been purchased. Once purchased, the remote/far antenna circuit may be disabled, leaving one or more other antenna circuits for use by the consumer or post-consumption purposes. In any event, the ability to use and subsequently disable the remote/far antenna circuit allows products to be tracked prior to sale to address potential theft issues, while further allowing such theft monitoring to be disabled after the proper financial transaction has occurred. The present invention may be used in many other applications as well.

Figure 2:
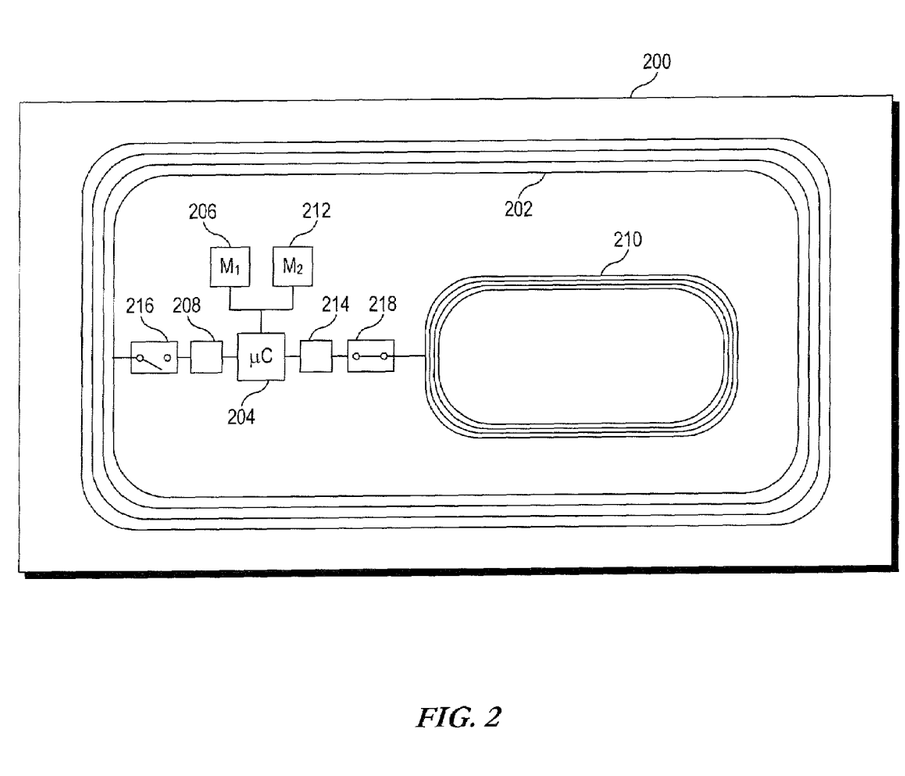
FIG. 2 illustrates a representative transponder implementing a plurality of antenna circuits operating at different reader-tag distances in accordance with one embodiment of the present invention.

FIG. 2 illustrates a representative transponder (tag) 200 implementing a plurality of antenna circuits operating at different reader-tag distances in accordance with one embodiment of the present invention. The illustrated embodiment is configured such that it is responsive to two reader-tag distances by using two antenna circuits, although a greater number of antenna circuits may also be provided in accordance with the present invention. The representative transponder 200, e.g., an RFID tag, includes a first antenna circuit having at least the antenna loop 202. Associated with the first antenna circuit is a processing circuit, depicted in FIG. 2 as a microcontroller (μC) 204. The processing circuit 204 may be any type of processing circuit, including but not limited to a microcontroller, microprocessor, reduced instruction set controller (RISC), or the like. One or more memory or storage areas may also be associated with the first antenna circuit, such as memory $M_1$ 206. Other circuitry 208 may also be present, such as rectification circuitry and the like.

Assuming that the first antenna circuit is a passive, inductive tag circuit for purposes of the present description, a signal is received from a reader device at the antenna loop 202 of the first antenna circuit. The antenna loop/coil 202 generates an induced alternating current (AC) voltage in response to the time-varying signal received from the reader device. This induced AC voltage may be rectified via circuitry 208 to provide a voltage source for the tag 200. Using this source voltage, the processing circuit such as μC 204 can retrieve information from an associated memory such as $M_1$ 206, and transmit the retrieved information via the antenna coil 202.

The illustrated tag 200 also includes a second antenna circuit including at least the antenna coil 210. Associated with the second antenna circuit is a processing circuit, which may be the same processing circuit or a separate processing circuit as used with the first antenna circuit. In the illustrated example, the processing circuit is implemented as the same processing circuit used with the first antenna circuit, namely μC 204. One or more memory/storage areas may be associated with the second antenna circuit, such as $M_2$ 212. It should be noted that any of the memories (e.g., $M_1$ 206, $M_2$ 212, etc.) used in the various antenna circuits may be configured as read-only, or may be dynamically programmable such that new information and/or updated information may be added at any time (e.g., information added, deleted, or modified by a retail establishment making the items available for sale). Again, other circuitry 214 may also be present to provide functions such as rectification or other required functions for the particular implementation. One or more of the processor circuit, memory, and other circuitry may be shared by the multiple antenna circuits, or alternatively separate circuits may be provided. Operation of the second antenna circuit may be analogous to that described in connection with the first antenna circuit, except that the operating frequencies differ.

In accordance with one embodiment of the invention, one or both of the antenna circuits may be disabled, either temporarily or permanently, in order to facilitate the desired communication at the desired operating frequency. For example, the first antenna circuit including the antenna coil 202, μC 204, $M_1$ 206, and other circuitry 208 may be active exclusively or together with the second antenna circuit including antenna coil 210, μC 204, $M_2$ 212, and other circuitry 214. This first antenna circuit may, for example, be configured for remote/far read distances at 900/2400 MHz frequency bands. If operable contemporaneously with the second antenna circuit or alone, the first antenna circuit will communicate with a reader at remote/far read distances, such as during manufacturing, logistics, or other pre-consumer periods of a supply chain.

When the second antenna circuit is to be utilized (e.g., at the point of sale and/or during consumer use), the first antenna circuit may be disabled. This is depicted by the functional switch 216, which removes the antenna loop 202 from the circuit or otherwise disables the antenna circuit. More particularly, in the case where separate processor circuits are implemented for each of the multiple antenna circuits, removing a connection between the antenna circuit and its respective processor circuit (and/or other circuits) would prohibit the generation of the voltage required to power the processor circuit. Where a single processor circuit is used for multiple antenna circuits, the "switch" function 216 may serve as a signal to the processing circuit to take no action for that antenna circuit, or may otherwise disable the proper return of information from the tag to the reader. However, in one embodiment of the invention, each of the respective antenna circuits is separate such that the switch functions 216, 218 disable either or both of the connections to the antenna loops.

In operation, the first antenna circuit including antenna loop 202 may be operable during, for example, the manufacturing/logistics phase of a supply chain. When the product reaches the point of sale, customers may want to obtain product information from the product. For various reasons including privacy reasons detailed above, it may be desirable for only near/touch read distances to apply. In such a case, the first antenna loop 202 may be disabled at the appropriate time, such as when placed on shelves at a retail store, at the actual point of sale, etc. This disables the remote/far reading capability, leaving active only the near/touch reading capability. With reference to FIG. 2, this can be accomplished by deactivating switch function 216 to remove the remote/far antenna loop 202 from the circuit, thereby leaving only the second antenna circuit using antenna loop 210 active.

It should be recognized that disabling such antenna circuits may be temporary or permanent. In one embodiment of the invention, antenna circuit disabling is permanent, such as by open-circuiting a fuse or other irreversible circuit element. In another embodiment, disabling is temporary, such as by using an electronic, mechanical switch, or other reversible switching element.

Figure 3:
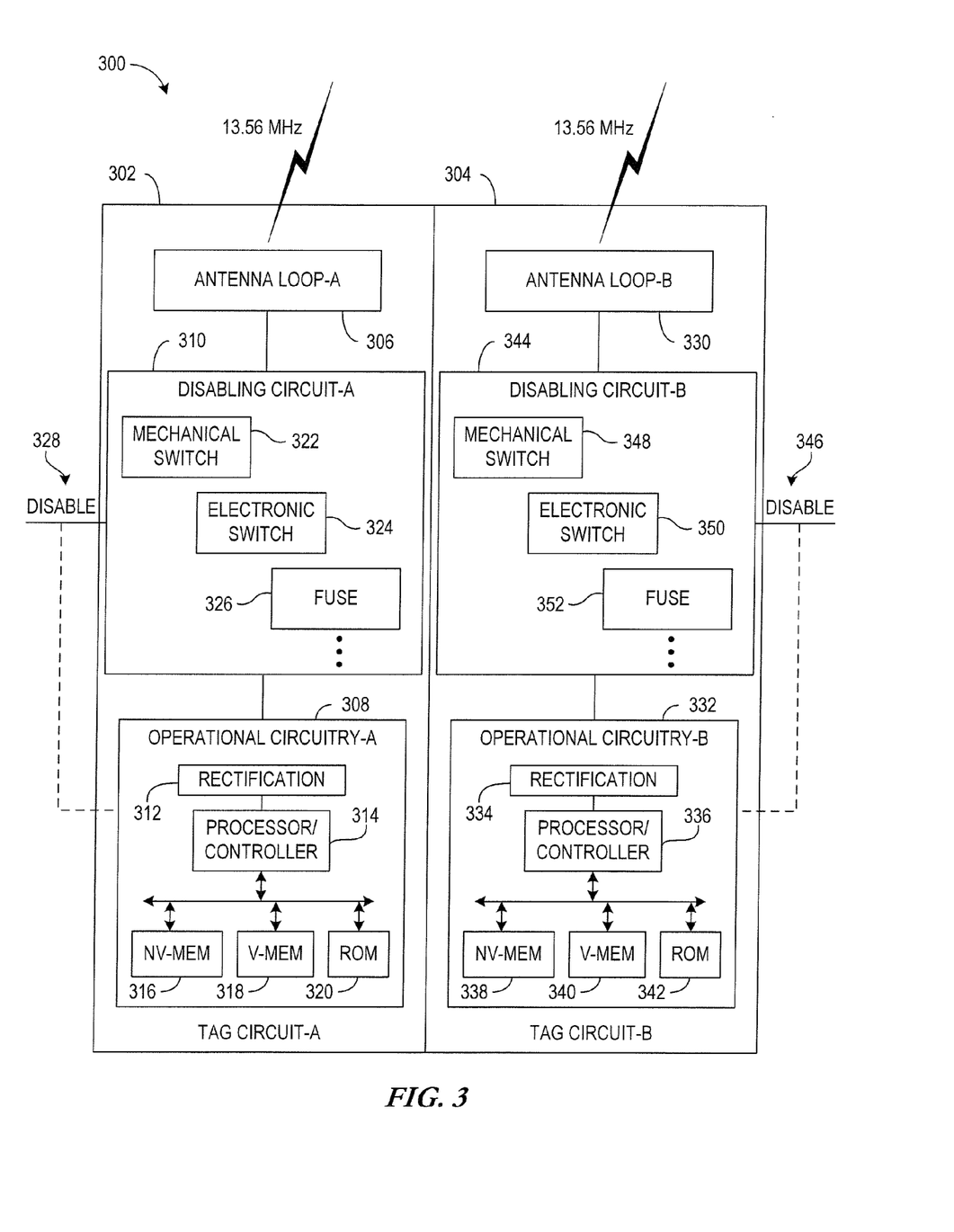
FIG. 3 is a block diagram of a representative dual-mode RFID tag in accordance with the principles of the present invention.

FIG. 3 is a block diagram of a representative dual-mode RFID tag 300 in accordance with the principles of the present invention. The illustrated embodiment employs two tag circuits, tag circuit-A 302 and tag circuit-B 304, although the same principles apply to any multiple quantity of tag circuits. For purposes of example, tag circuit-A 302 and tag circuit-B 304 may both operate using a common frequency, or the tag circuits may operate at different frequencies.

Tag circuit-A 302 includes an antenna loop 306 and its associated operational circuitry 308, as well as a disabling circuit 310. Operational circuitry-A 308 may include, for example, rectification circuitry 312 to rectify the received time-varying signal to generate an operational voltage for the processor/controller 314 and other components associated with circuitry-A 308. Circuitry-A 308 may include one or more memory or storage elements, such as non-volatile (NV) memory 316, volatile (V) memory 318, and read-only memory (ROM) 320. As is known in the art, NV memory includes memory such as electrically-erasable programmable ROM (EEPROM), FLASH memory, and other memories that retain information upon loss of power. Tracking information, sorting information, or other such data sought by the reader may be stored in such NV memory 316. Such information may alternatively, or in addition, be stored in ROM 320. ROM 320 may also store program instructions operable by the processor/controller 314. Other memory, such as the volatile (V) memory 318, may be used by the processor/controller 314 in connection with performing computations or other temporary storage requirements that do not require that the data be retained after loss of power.

Antenna loop-A 306 can thus receive a signal from a reader device, which ultimately powers the components associated with the operational circuitry-A 308, thereby allowing information to be transmitted back to the reader device. This is commonly referred to as "backscattering." Tag circuit-A 302 is thus responsive to the 13.56 MHz frequency band in the illustrated embodiment, and may be used for remote/far reader distances due to physical antenna properties (e.g., antenna loop diameter, number of loop turns, etc.) that facilitate remote/far reader distances. Tag circuit-A 302 can be disabled to discontinue such remote/far reader capabilities by way of the disabling circuit-A 310. For example, disabling of tag circuit-A 302 may be accomplished using a mechanical switch 322, electronic switch 324, fuse 326, or other analogous disabling mechanism, in response to the appropriate disable signal 328. By disabling the antenna loop-A 306 from the operational circuitry-A 308, the circuitry 308 will not be powered nor will it perform the functions required to return information to a reader device. It should be noted that the disable signal 308 may alternatively be provided to the operational circuitry-A 308, such that it notifies the processor/controller 314 or other enabling circuitry whether the tag circuit-A 302 is to be operational.

When tag circuit-A 302 has been disabled, communication with the appropriate reader device(s) can occur exclusively by way of tag circuit-B 304. Tag circuit-B 304 of FIG. 3 includes circuitry analogous to that of tag circuit-A 302, including an antenna loop-B 330 configured for 13.56 MHz communication, and operational circuitry-B 332 which may include rectification circuitry 334, a processor/controller 336, and any one or more various types of memory or storage 338, 340, 342. Tag circuit-B 304 may also be disabled if desired, using the disabling circuit-B 344 and disable signal 346, where the disabling circuit-B 344 again may implement any type of disabling circuitry including a mechanical 348 and/or electrical 350 switch, a fuse(s) 352, and the like. The tag 300 can thus be used during manufacturing/logistics to facilitate remote/far RF communication for tracking, sorting, or other related functions, and then disabled to allow, for example, near/touch RF communication for consumer use.

It should be noted that the operational circuitry-A 308 and operational circuitry-B 332 may be implemented as a single operational circuit. For example, one processor/controller may be used for each of the plurality of antenna loops 306, 330. Multiple memory circuits may still be provided however. For example, a first memory may be provided to store information for transmission via a first antenna circuit, while another memory may be provided to store information for transmission via a second antenna circuit. Utilizing separate operational circuits 308, 332 as shown in FIG. 3 merely represents one embodiment of the present invention.

Figure 4:
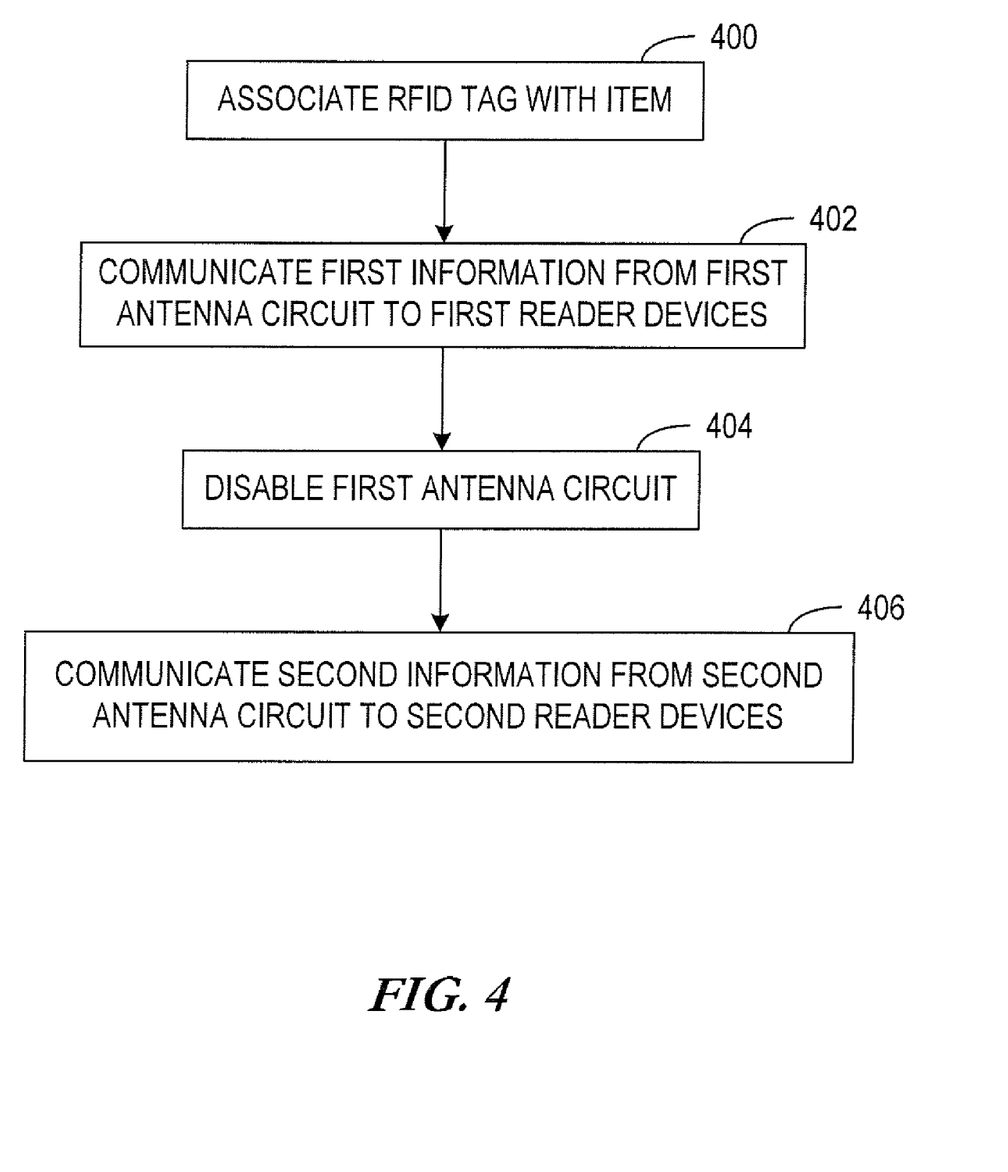
FIGS. 4 and 5 are flow diagrams illustrating various embodiments of methods for obtaining information regarding an item in accordance with the present invention.

FIG. 4 is a flow diagram illustrating one embodiment of a method for obtaining information regarding an item. A transponder, such as an RFID tag, is associated with the item as shown at block 400. The RFID tag may be associated with an item by attaching, adhering, fastening, or otherwise providing the RFID tag in proximity to the item. Upon receipt of a triggering signal from a first reader device(s), information is communicated 402 from a first antenna circuit configured for use at the frequency of the triggering signal. If the RFID tag is an active tag (i.e., having a local power source), the triggering signal can be any signal recognizable by the tag. The tag can then transmit the information via any appropriate manner of transmission. Where the RFID tag is a passive tag, the triggering signal typically involves a time-varying carrier signal on which the first information is returned by way of backscatter modulation via the carrier signal.

At some point, it may be desirable to prohibit further communication with the tag by the first reader device(s). For example, in a supply chain implementation, it may be desirable to discontinue remote/far communication by reader devices of the type used during the manufacturing and/or logistics stages of the supply chain. In such a case, the first antenna circuit is disabled 404. Disabling may be reversible or irreversible. However, a second antenna circuit provided on the tag may then be used to communicate 406 second information to a second reader device(s). For example, in the supply chain implementation, the second information may be information relevant to a consumer, and bringing near or touching the consumer's reader-equipped mobile terminal to the item can therefore furnish the second information to the consumer's mobile terminal.

Figure 5:
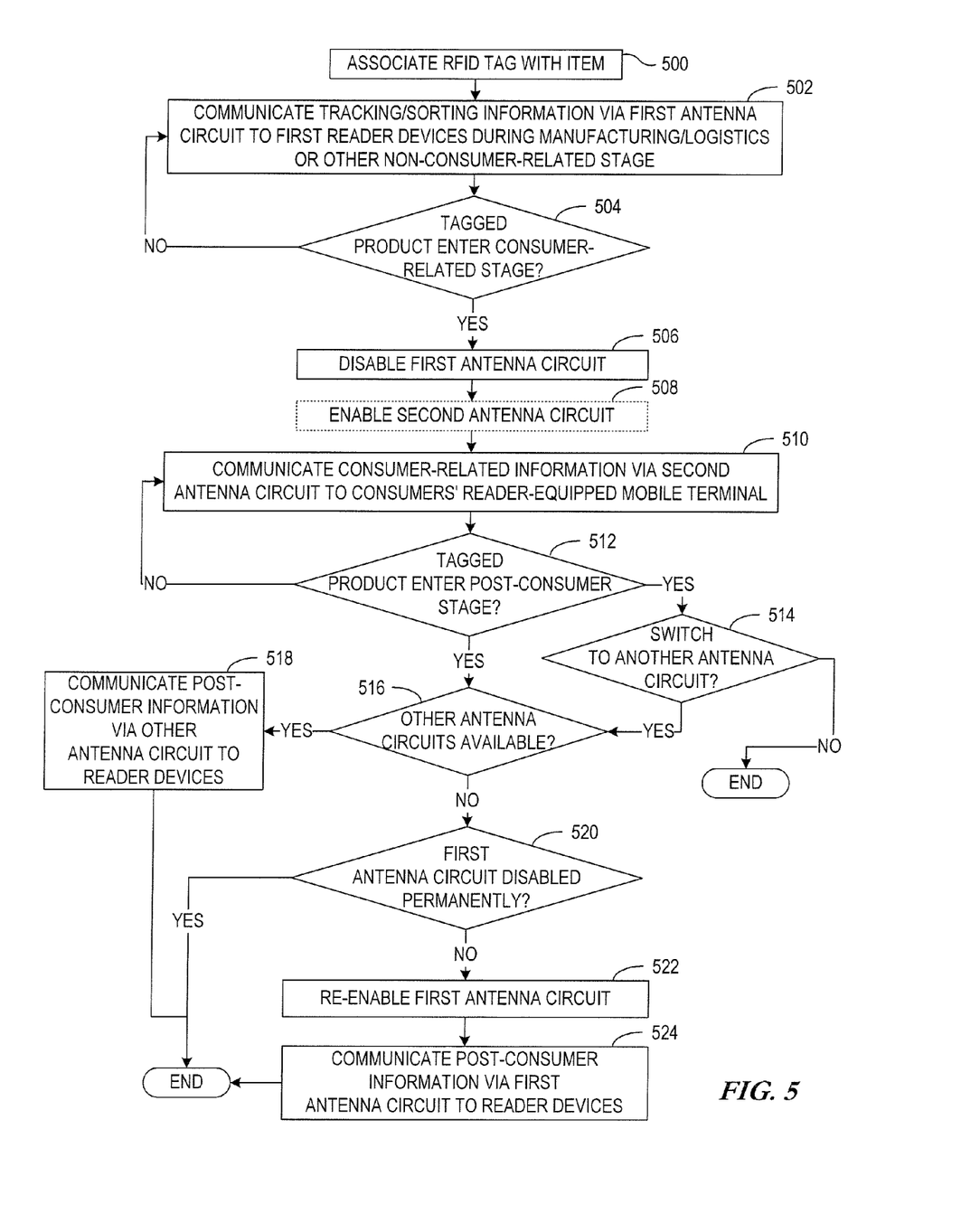

FIG. 5 is a flow diagram illustrating a more particular embodiment of a method for obtaining information regarding an item. In the illustrated embodiment, an RFID tag is associated 500 with an item, such as a product in a supply chain. Information, such as tracking/sorting information, is communicated 502 via a first antenna circuit having a first antenna geometry/configuration to one or more first reader devices during the manufacturing/logistics or other non-consumer-related stage. Operation may be conducted at any suitable frequency, such as 13.56 MHz, 900 MHz, 2.4 GHz, etc. When the tagged product enters the consumer-related stage of the supply chain as determined at decision block 504, the first antenna circuit is disabled 506. A second antenna circuit may optionally be enabled 508; however in a preferred embodiment of the invention the second antenna circuit is already enabled. For example, the second antenna circuit may be initially configured as enabled. It should be noted that in one embodiment, the same frequency is used in connection with both the first and second antenna circuits, and the difference in antenna geometries/configurations between the first and second antenna circuits dictates the near-far distinction. In another embodiment, a first reader frequency may be used in connection with the first antenna circuit, and a second reader frequency may be used in connection with the second antenna circuit.

When the first antenna circuit has been disabled, the reader devices used during the manufacturing/logistics stages will no longer be able to read information from the tag. Instead, consumer-related information may be communicated 510 via the second antenna circuit to the consumers' reader-equipped mobile terminals. The consumer product selection and product use stages may ultimately come to an end, where the user may choose to discard and/or recycle the tagged product. When the tagged product enters such a post-consumer stage as determined at decision block 512, a possibility may exist to switch to yet another antenna circuit as determined at decision block 514. If so, it is determined 516 if other antenna circuits are available. If so, the post-consumer information (e.g., product type information used in recycling) may be communicated 518 by way of that antenna circuit to the appropriate reader devices. If other antenna circuits are not available, or if it is preferable and possible, it may be desirable to return to a previously-disabled antenna circuit. In the illustrated embodiment, it is therefore determined 520 whether the first antenna circuit was disabled permanently. If so, the tag will not be switched to another antenna circuit. If, however, the first antenna circuit was disabled temporarily (i.e., in a reversible manner), the first antenna circuit is re-enabled 522, and the post-consumer information may be communicated 524 via the first antenna circuit to the appropriate reader devices.

Figure 6:
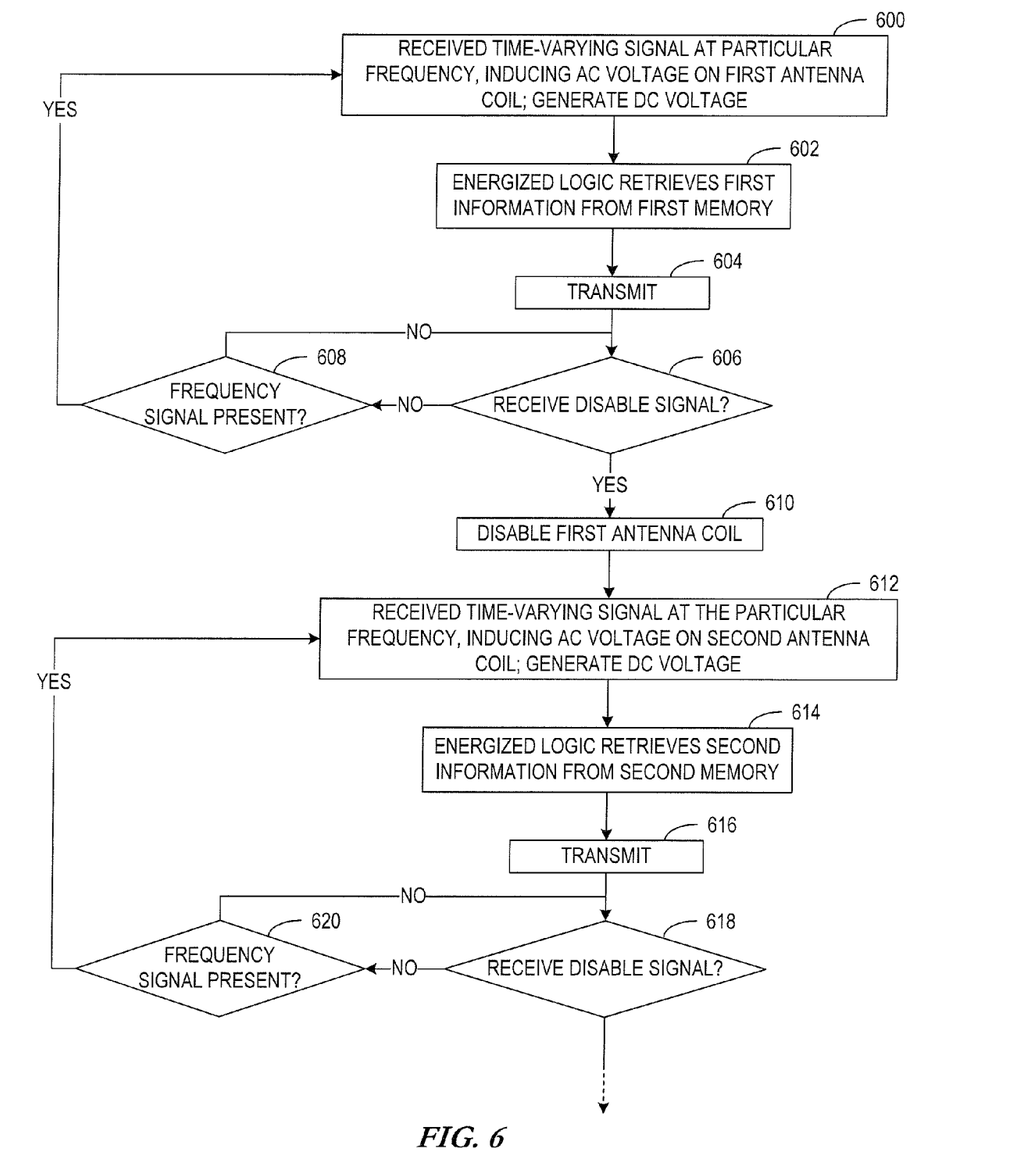
FIG. 6 is a flow diagram illustrating one embodiment of a method in which a passive RFID tag or other analogous RF transponder provides information associated with an item.

FIG. 6 is a flow diagram illustrating one embodiment of a method in which a passive RFID tag or other analogous RF transponder provides information associated with an item. This embodiment assumes that a common reader frequency is used to activate each of the multiple antenna circuits on the tag, where each of the antenna circuits has different antenna geometries/configurations to account for near/far communication capabilities. As shown at block 600, the tag receives a time-varying signal at a particular frequency band (e.g., 900/2400 MHz), induces an AC voltage on a first antenna coil provided at the tag, and generates a substantially DC voltage from the induced voltage. Using this DC voltage, tag logic can be energized to retrieve 602 first information from a first memory, and to transmit 604 the first information for use by the initiating reader device(s). In the case of an active tag, such transmission is powered at the tag circuit. In the case of a passive tag, the information is transmitted via backscatter modulation by modulating the information on the backscattered carrier signal.

If the tag does not receive a disable signal for the first antenna coil as illustrated at decision block 606, and the frequency signal is present 608, the process continues using the first antenna coil. At some point, the tag may receive 606 a disable signal, whereby the tag disables 610 the first antenna coil in response thereto. No further communication is therefore available via the first antenna coil. As shown at block

612, the tag may, however, receive the time-varying signal at the particular frequency when the reader device is within a communication range supported by a second antenna geometry/configuration which facilitates a near/touch reader-tag distance. A near/touch reader-tag distance may be desirable for purposes of user privacy, reader-tag compatibility, and the like. A second antenna coil receiving the reader signal induces an AC voltage on the coil, and a DC voltage is generated to energize the tag logic. The energized tag logic retrieves 614 second information from a second memory, and transmits 616 the second information for use by the initiating reader device (s).

In one embodiment of the invention, further numbers of antenna coils may be implemented on the tag. For example, if the tag does not receive a disable signal for the second antenna coil as illustrated at decision block 618, and the second frequency signal is present 620, the process continues using the second antenna coil. Otherwise, if a disable signal is received for the second antenna coil, the process can continue for each antenna circuit available on the tag. In another embodiment, less than all of the available antenna circuits may be disabled, in which case multiple antenna circuits may be concurrently active.

In accordance with one embodiment of the invention, the selectivity for the read distance at a given frequency band may be provided by including multiple antenna geometries on a tag for that given frequency band. For example, the interaction distance between the tag and the reader for 13.56 MHz technology may be governed by the reader and tag antenna loop physical size. More particularly, RF tags at such a frequency band may be on the order of "credit card sized" to enable reading from somewhat far distances. Some reader implementations, such as at doors, public transport facilities, etc., have smaller read distances such as on the order of 5-10 cm as the reader coil dimension is approximately 10 cm in diameter.

Considering 13.56 MHz technology as a first example, the present invention provides multiple antenna loops for the tag that are operable using the 13.56 MHz technology. At a 13.56 MHz (or similar) operating frequency, the wavelength is approximately 22 meters. This length is typical much greater than the antenna length and the reader distance, and therefore inductive coupling takes place in the antenna's near field region. The energy coupling mechanism is magnetic where the dimensions of the read distance are small compared to the wavelength, which may be the case at 13.56 MHz.

In accordance with the present invention, a first antenna geometry may include an antenna loop approximately credit card sized to allow for more remote read distances, while providing a second antenna geometry including a smaller antenna loop to operate at near/touch read distances. As a more particular example, an antenna loop dimension of approximately 10 mm in diameter corresponds to a read distance of approximately 40 mm maximum, assuming regulatory limits of the emitted power of the reader are honored. A near/touch read distance works well where the user is reading information using a mobile device, as it is intuitive for a user to "touch" and/or bring the mobile device into close proximity of the particular tag of interest. In this manner, a first antenna geometry at the 13.56 MHz frequency band may be used for remote/far read distances (e.g., during manufacturing/logistics stages), while a second antenna geometry at the 13.56 MHz frequency band may be used for near/touch read distances (e.g., during consumer use stages). Additional antenna geometries could also be used where intermediate read distances is feasible. In any event, multiple read distances may be defined by having certain antenna geometries (e.g., antenna loop diameters, number of loop turns, etc.) on the RF tag.

Such an embodiment is applicable to other frequency ranges. For example, the antenna geometry may be used to define the read distance at higher UHF frequencies, such as 900 MHz, 2400 MHz, etc. At such frequencies, the wavelength is significantly shorter than 13.56 MHz, and is in the range of about 10-35 cm. Therefore, different antenna configurations and/or dimensions may be used to provide multiple antenna circuits at such frequencies. The RF field generated by the reader is dominated by near field effects up to distances of, for example 10-20% of the wavelength, which is approximately 1-3 cm for 900/2400 MHz frequencies. The RF field generated by the reader is dominated by far field effects at greater distances. More particularly, electromagnetic waves typically exhibit "far-field" properties on length scales that are longer than their wavelength. Thus, far-field properties are exhibited at approximately 35 cm for 900 MHz frequencies, and at approximately 13 cm for 2.4 GHz frequencies. Different antenna configurations and dimensions may be used for such far-field situations. Loop antenna designs may be used, as well as other configurations such as dipole antenna arrangements where applicable. For example, a dipole antenna having a straight electrical conductor measuring approximately one-half the wavelength from end to end and connected at the center to the RF feed line may be used at UHF frequencies.

At short distances or "near-field," (e.g., 20% of the wavelength), the RF interaction is different from the far field interaction. Since the RF field generated by the reader device is dominated by near field effects up to distances of about 20% of the wavelength (e.g., approximately 1-3 cm for these UHF frequencies), such an antenna configuration may be employed for use with mobile devices equipped with near-field read-capable. It may be desirable to utilize such near-field readers with mobile devices, as such a near/touch mode is intuitive for the user of the mobile device. Such reader circuitry may also be made to be switchable to far-field mode, as the UHF/VHF read power for far distances up to approximately 4 m is as small as 0.5 W. Thus, the read distance may be defined in accordance with the invention by having two (or more) separate antenna configurations for the near/far field electromagnetic field, and therefore a tag may be implemented that is selectively sensitive to short or long read distances.

The tags in accordance with the present invention may be used in connection with any type of reader device. For example, RFID tags may be read by dedicated RFID readers, or other computer and electronics devices that are equipped with RFID readers. In one particularly useful implementation, commonly used mobile devices may conveniently be equipped with RFID readers, such as wireless/cellular telephones, personal digital assistants (PDAs), or other wireless handsets and communicators, as well as portable computing devices capable of wireless communication. Such RFID readers may be provided integrally with the mobile devices or may be provided as an accessory. The RFID readers associated with such mobile devices are often configured for near/touch reader-tag distances for purposes such as privacy and antenna coil size. On the other hand, manufacturing, logistics, recycling, item tracking, or other uses often require RFID readers to be configured for remote/far reader-tag distances. The multi-mode tags of the present invention therefore provide a manner in which the same product or other item can be utilized for purposes ranging from near/touch to remote/far.

Figure 7:
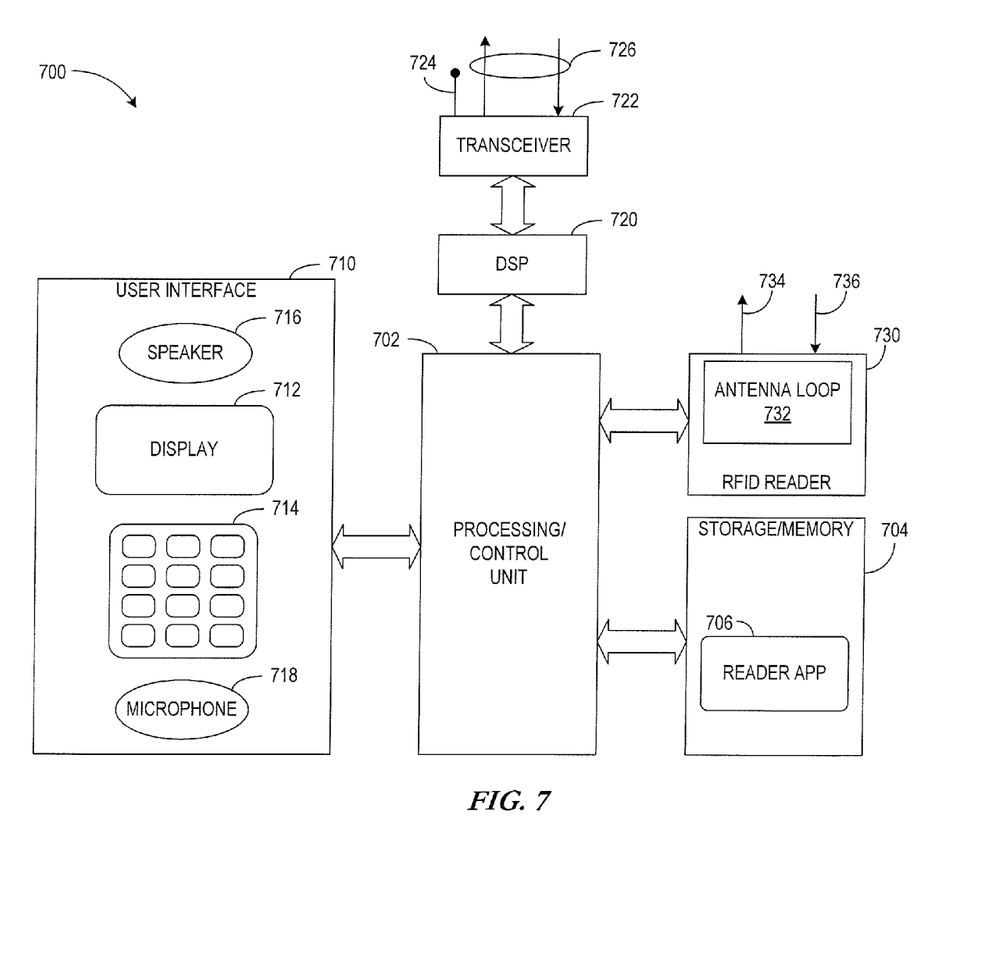
FIG. 7 illustrates a representative mobile terminal computing system capable of carrying out reader operations in accordance with the invention.

The mobile terminals that can be equipped with an RFID reader utilize computing systems to control and manage the conventional device activity as well as the reader functionality. Hardware, firmware, software or a combination thereof may be used to perform the various functions and operations. An example of a representative mobile terminal computing system capable of carrying out RFID reading operations in accordance with the invention is illustrated in FIG. 7.

The exemplary mobile computing arrangement 700 suitable for performing reading operations in accordance with the present invention may include a processing/control unit 702, such as a microprocessor, reduced instruction set computer (RISC), or other central processing module. The processing unit 702 need not be a single device, and may include one or more processors. For example, the processing unit may include a master processor and associated slave processors coupled to communicate with the master processor.

The processing unit 702 controls the basic functions of the mobile terminal as dictated by programs available in the program storage/memory. Thus, the processing unit 702 executes the functions associated with the RFID reading aspects of the present invention. More particularly, the program storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. Application modules associated with the present invention, such as the reader application 706 may also be transmitted to the mobile computing arrangement 700 via data signals, such as being downloaded electronically via a network, such as the Internet and intermediary wireless networks.

The program storage/memory 704 may also be used to store data, such as the content provided by an RFID tag. In one embodiment of the invention, the content is stored in non-volatile electrically-erasable, programmable ROM (EEPROM), flash ROM, etc. so that the content is not lost upon power down of the mobile terminal.

The processor 702 is also coupled to user-interface 710 elements associated with the mobile terminal. The user-interface 710 of the mobile terminal may include, for example, a display 712 such as a liquid crystal display, a keypad 714, speaker 716, and microphone 718. These and other user-interface components are coupled to the processor 702 as is known in the art. The keypad 714 includes alpha-numeric keys for performing a variety of functions, including dialing numbers and executing operations assigned to one or more keys. For example, in accordance with the present invention, RFID reading functions may be initiated and/or carried out using the keypad 714. Alternatively, other user-interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, transmits and receives the radio signals 726 between the wireless device and a network.

In connection with the present invention, the mobile computing arrangement 700 includes an RFID reader device 730, which includes the antenna loop 732. The reader 730 emits signals 734 which can be recognized by tags, thereby activating the tags. In response, the tags provide information signals 736 by way of direct transmission (in the case of active tags) or via backscattered modulation of the carrier signal (in the case of passive tags). The returned information may then be processed by the processing unit 702 and reader application 706.

The mobile computing arrangement 700 of FIG. 7 is provided as a representative example of a computing environment in which RFID readers may be implemented. From the description provided herein, those skilled in the art will appreciate that such reader implementations may be incorporated into a variety of other currently known and future mobile computing environments. Using the description provided herein, the invention may be implemented as a machine, process, or article of manufacture by using standard programming and/or engineering techniques to produce programming software, firmware, hardware or any combination thereof. Further, any resulting program(s), having computer-readable program code, may be embodied on one or more computer-usable media such as resident memory devices, smart cards or other removable memory devices, or transmitting devices, thereby making a computer program product or article of manufacture according to the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, it will be apparent to those skilled in the art from the foregoing description that the invention is equally applicable to other current or future radio frequency identification technologies using, for example, electromagnetic/electrostatic coupling, and thus the present invention is not limited to "RFID" technology as this term is currently used. Further, while various embodiments of the invention are described in terms of a supply chain implementation, the present invention is applicable in any environment in which the ability to define or disable the read distance provides value. It is intended that the scope of the invention be limited not with this detailed description, but rather determined by the claims appended hereto.

What is claimed is:

1. A tag comprising:
   operational tag circuitry configured to provide information in response to being activated by one or more reader devices;
   at least two antenna circuits coupled to the operational tag circuitry, wherein each of the at least two antenna circuits is configured to operate at a different reader-tag distance, and wherein the at least two antenna circuits comprises: a) a first antenna circuit that causes the operational tag circuitry to provide point-of-sale tracking information in response to a far-range, point-of-sale, activation signal; and b) a second antenna circuit that causes the operational tag circuitry to provide at least one of consumption and post-consumption tracking information in response to a near-range activation signal; and
   at least one disabling circuit coupled to the operational tag circuitry and to at least one of the at least two antenna circuits, wherein the at least one disabling circuit is configured to disable operation of the first antenna circuit in response to a point of sale disable signal.

2. The tag as in claim 1, wherein the at least one disabling circuit comprises a permanent disabling circuit configured to irreversibly disable operation of the at least one of the antenna circuits to which it is coupled.

3. The tag as in claim 2, wherein the permanent disabling circuit comprises one or more of a mechanical switch, electronic switch, and a fuse.

4. The tag as in claim 1, wherein the at least one disabling circuit comprises a temporary disabling circuit configured to temporarily disable operation of the at least one of the antenna circuits to which it is coupled.

5. The multi-mode RF transponder as in claim 4, wherein the temporary disabling circuit temporarily disables operation of the first antenna circuit in response to the disable signal and re-enables the operation of the first antenna circuit in response to an enabling circuit at a point of disposal.

6. The tag as in claim 4, wherein the temporary disabling circuit comprises one or more of a mechanical switch and an electronic switch.

7. The tag as in claim 1, wherein the disabling circuit comprises means for open-circuiting a connection between the operational tag circuitry and one or more of the antenna circuits.

8. The tag as in claim 1, wherein the at least two antenna circuits are configured to operate at different frequency bands.

9. The tag as in claim 1, wherein the at least two antenna circuits comprise N antenna circuits, wherein the at least one disable circuit disables N−1 of the antenna circuits in response to the point of sale disable signal, and wherein a remaining one of the N antenna circuits causes the operational tag circuitry to provide at least one of the consumption and the post-consumption tracking information in response to the near-range activation signal.

10. The tag as in claim 1, wherein a first of the at least two antenna circuits is configured to induce a voltage to power the operational tag circuitry in response to a received signal having a frequency in approximately a 13.56 MHz frequency band, and wherein a second of the at least two antenna circuits is configured to induce a voltage to power the operational tag circuitry in response to a received signal having a frequency in approximately a 900/2400 MHz frequency band.

11. A method, comprising:
associating a radio frequency identification tag with an item, wherein the radio frequency identification tag includes at least two antenna circuits each operable at a different reader-tag distance;
communicating first information from a first of the at least two antenna circuits to one or more first reader devices operable at a first reader-tag distance, wherein the first reader-tag distance comprises a far-range, point-of-sale tracking distance, and wherein the first information comprises point-of-sale tracking information;
disabling the first antenna circuit in response to a disable signal at a point of sale; and
communicating second information from the second antenna circuit to one or more second reader devices operable at a second reader-tag distance, wherein the second reader-tag distance comprises a near-range distance, and wherein the second information comprises at least one of consumption and post-consumption tracking information.

12. The method of claim 11, wherein disabling the first antenna circuit comprises irreversibly disabling the first antenna circuit.

13. The method of claim 11, wherein disabling the first antenna circuit comprises temporarily disabling the first antenna circuit.

14. The method of claim 13, further comprising re-enabling the first antenna circuit to reestablish communication between the first antenna circuit to the one or more first reader devices operable at the first frequency band.

15. The method of claim 14, wherein re-enabling the first antenna circuit occurs at a point of disposal.

16. The method of claim 15, further comprising disabling the second antenna circuit in connection with re-enabling the first antenna circuit at the point of disposal.

17. The method of claim 14, further comprising disabling the second antenna circuit in connection with re-enabling the first antenna circuit.

18. The method of claim 11, wherein disabling the first antenna circuit comprises open-circuiting a connection between tag circuitry and an antenna coil on the first antenna circuit.

19. The method of claim 11, wherein the at least two antenna circuits comprise N antenna circuits, and further comprising disabling N−1 of the antenna circuits, and communicating information from a remaining enabled one of the at least two antenna circuits to one or more reader devices operable at a corresponding reader-tag distance.

20. A tag, comprising:
means for receiving a first radio frequency signal from a first reader device via a first antenna, wherein the first radio frequency signal comprise a far-range, point-of-sale tracking signal;
means for transmitting first information to the first reader device in response to receiving the first radio frequency signal, wherein the first information comprises point-of-sale tracking information;
means for disabling the first antenna in response to a disable signal at a point of sale;
means for receiving a second radio frequency signal from a second reader device, wherein the second signal device comprises a near-range RF signal; and
means for transmitting second information to the second reader device in response to receiving the second radio frequency signal, wherein the second information comprises at least one of consumption and post-consumption tracking information.

* * * * *